US008926942B2

(12) United States Patent
Castaldi et al.

(10) Patent No.: US 8,926,942 B2
(45) Date of Patent: Jan. 6, 2015

(54) METHODS AND SYSTEMS FOR GENERATING HYDROGEN AND SEPARATING CARBON DIOXIDE

(75) Inventors: Marco J. Castaldi, Yonkers, NY (US); Robert J. Farrauto, Princeton, NJ (US); Tuncel M. Yegulalp, Teaneck, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1261 days.

(21) Appl. No.: 12/679,506

(22) PCT Filed: Feb. 22, 2008

(86) PCT No.: PCT/US2008/054726
§ 371 (c)(1),
(2), (4) Date: Jul. 22, 2010

(87) PCT Pub. No.: WO2009/042244
PCT Pub. Date: Apr. 2, 2009

(65) Prior Publication Data
US 2010/0284904 A1    Nov. 11, 2010

Related U.S. Application Data

(60) Provisional application No. 60/975,930, filed on Sep. 28, 2007.

(51) Int. Cl.
*C01B 31/18* (2006.01)
*B01D 53/02* (2006.01)
*C01B 3/38* (2006.01)
*C01B 3/48* (2006.01)
*C01B 3/56* (2006.01)

(52) U.S. Cl.
CPC . *B01D 53/02* (2013.01); *C01B 3/38* (2013.01); *C01B 3/48* (2013.01); *C01B 3/56* (2013.01); *B01D 2253/112* (2013.01); *B01D 2256/16* (2013.01); *B01D 2259/504* (2013.01); *C01B 2203/0233* (2013.01); *C01B 2203/0283* (2013.01); *C01B 2203/0425* (2013.01); *C01B 2203/0475* (2013.01); *C01B 2203/06* (2013.01); *C01B 2203/066* (2013.01); *C01B 2203/1064* (2013.01); *C01B 2203/1235* (2013.01); *C01B 2203/82* (2013.01); *Y02C 10/08* (2013.01)
USPC .................. 423/652; 422/187; 423/654

(58) Field of Classification Search
USPC .................. 423/645, 652, 654; 422/187
See application file for complete search history.

(56) References Cited

U.S. PATENT DOCUMENTS

| 6,790,432 B2 * | 9/2004 | Ruettinger et al. ........... 423/656 |
| 2002/0006363 A1 * | 1/2002 | Feeley et al. ................. 422/171 |
| 2002/0098394 A1 * | 7/2002 | Keefer et al. .................. 429/13 |

OTHER PUBLICATIONS

International Search Report and the Written Opinion of the International Searching Authority, International Application No. PCT/US2008/054726, filed Feb. 22, 2008.

*Primary Examiner* — Stanley Silverman
*Assistant Examiner* — Syed Iqbal
(74) *Attorney, Agent, or Firm* — Wiggin and Dana LLP; Anthony P. Gangemi (57) ABSTRACT

Methods and systems for generating hydrogen and separating carbon dioxide from a feed stream including hydro-carbons and water are disclosed. In some embodiments, the method includes the following: providing a catalytic chamber including a monolithic structure having surfaces coated with carbon dioxide adsorbing materials and one or more washcoated layers of combined steam reforming, water gas shift, and combustion catalysts; directing the feed stream into said catalytic chamber; controlling the feed stream so that it has a temperature range that allows the reactive generation of carbon dioxide and hydrogen gas but does not cause substantial development of coke between hydrocarbons in the feed stream and said surfaces of said monolithic structure; and adsorbing said carbon dioxide generated by heating the feed stream, wherein said carbon dioxide is adsorbed onto carbon dioxide adsorbing materials on said surfaces of said monolithic structure.

17 Claims, 5 Drawing Sheets

METHODS AND SYSTEMS FOR GENERATING HYDROGEN AND SEPARATING CARBON DIOXIDE

CROSS REFERENCE TO RELATED APPLICATION(S)

This application claims the benefit of U.S. Provisional Application No. 60/975,930, filed Sep. 28, 2007, which is incorporated by reference as if disclosed herein in its entirety.

BACKGROUND

Carbon dioxide from stationary and mobile sources is believed to be a major contributor to the greenhouse gas effect. Future utilization of fossil-based fuels necessitates a technology for addressing the carbon dioxide emissions. Many of technologies aimed at sequestering carbon dioxide require a concentrated stream of pure gas to be effective. The Zero-Emission Coal Alliance (ZECA) proposed a novel power plant designed to produce pure streams of hydrogen, for energy generation, and carbon dioxide, for sequestration, from coal.

The ZECA power plant can be visualized by a series of four reactors. Coal is gasified in the presence of hydrogen in the first reactor and the resulting methane is steam-reformed into hydrogen in the subsequent reactor, where calcium oxide is used to capture carbon dioxide in situ. Calcium oxide (CaO) is regenerated in the third reactor, thus producing pure carbon dioxide. Last, hydrogen is converted to electricity in the fourth reactor employing high temperature fuel cells.

The use of calcium oxide in the ZECA power plant is not limited to carbon dioxide separation from other gaseous products. Sorption of carbon dioxide in situ allows for the equilibrium of hydrogen generating reactions to be shifted to the right. Furthermore, in presence of calcium oxide, both the reforming and the water gas shift (WGS) reactions can take place within the same reactor. The steam reforming and subsequent water gas shift reactions are as follows:

Steam Reforming: $CH_4 + H_2O \leftrightarrow 3H_2 + CO$ [1];

and

Water Gas Shift: $CO + H_2O \leftrightarrow H_2 + CO_2$ [2].

Steam reforming is an endothermic process and is favored at high temperatures. If the steam reforming reaction is conducted at lower temperatures, e.g. less than 500 degrees Celsius, the exothermic water gas shift reaction becomes thermodynamically significant and the carbon monoxide (CO) levels can be further reduced with the generation of carbon dioxide ($CO_2$). By sequestering the $CO_2$, the reaction equilibriums are shifted towards the right and more hydrogen is generated. Therefore, the WGS reaction can be conducted at higher temperatures with more favorable kinetics.

The use of calcium oxide as a carbon dioxide sorbent is being heavily investigated for applications in both power plant designs and hydrogen production. Packed bed, moving bed, and fluidized bed reactors are proposed as suitable designs for such applications. However, these types of reactors would inevitably run into limitations presented by the physical properties of CaO and calcium carbonate ($CaCO_3$). The reaction of CaO with $CO_2$ is very rapid and is chemically controlled initially. Once a layer of carbonate is formed on the surface, the reaction is limited by the diffusion of $CO_2$ through this layer. The fluidized bed design might be optimized to overcome the diffusion limits but typically at the expense of a large pressure drop across the reactor. In addition, bulk CaO is subject to loss of pore volume and sintering at high temperatures, especially when subjected to multiple cycles as necessitated by its applications.

In some systems, it is also been found there was no loss of reactivity of regenerated CaO over a period of 30 days at 629° C. when an un-pressed powder is used. However, this is primarily due to sintered CaO on the surface with reduced surface area acting as a barrier for the rest of the CaO mass and forcing a diffusion limited reaction. While it is possible to operate with powders in fluidized beds, the pressure drop associated with them is very large. In addition, working with fine powders can be problematic as a portion of it typically is entrained in the process flow and must be separated.

Adsorption enhanced reforming processes have recently been investigated. Each process utilized particulate materials (catalysts and adsorbents or combinations of both). Due to the temperature stresses induced by the reforming-regeneration cycles required, particulates would begin to fatigue thereby producing fines, which will foul process equipment and severely shorten life of the process. Additional fracturing of the particles can occur from the volume expansion from CaO to carbonate. Additionally, due to the high temperatures needed to regenerate the sorbent and recover the $CO_2$, the materials are very likely to undergo severe sintering with a corresponding decrease in capacity with each cycle.

SUMMARY

Methods for generating hydrogen and separating carbon dioxide from a feed stream including hydrocarbons and water are disclosed. In some embodiments, the method includes the following: providing a catalytic chamber including a monolithic structure having surfaces coated with carbon dioxide adsorbing materials and one or more washcoated layers of combined steam reforming and water gas shifting catalysts; controlling the feed stream so that it has a temperature range that allows the reactive generation of carbon dioxide and hydrogen gas but does not cause substantial formation of coke between hydrocarbons in the feed stream and the surfaces of the monolithic structure; and adsorbing the carbon dioxide generated by heating the feed stream, wherein the carbon dioxide is adsorbed onto carbon dioxide adsorbing materials on the surfaces of the monolithic structure.

Methods for generating hydrogen and separating carbon dioxide from a feed stream including hydrocarbons and water are disclosed. In some embodiments, the method includes the following: providing a catalytic chamber including surfaces coated with carbon dioxide adsorbing materials and one or more washcoated layers of combined steam reforming and water gas shift catalysts; controlling the feed stream so that it has a temperature range that allows the reactive generation of carbon dioxide and hydrogen gas but does not cause substantial development of coke between hydrocarbons in the feed stream and the surfaces of the catalytic chamber; and adsorbing the carbon dioxide generated by heating the feed stream, wherein the carbon dioxide is adsorbed onto the surfaces of the catalytic chamber coated with carbon dioxide adsorbing materials.

Systems for generating hydrogen and separating carbon dioxide from a feed stream including hydrocarbons and water are disclosed. In some embodiments, the system includes the following: a catalytic chamber having an inlet and an outlet and means for opening and closing the inlet and the outlet; a monolithic structure positioned within the chamber, the monolithic structure having surfaces coated with carbon dioxide adsorbing materials and one or more washcoated layers of combined steam reforming and water gas shift catalysts; a heat source for heating the feed stream to a temperature range that allows the reactive generation of carbon dioxide and hydrogen gas but does not cause substantial development of coke between hydrocarbons in the feed stream and the surfaces of the monolithic structure; and means for heating the carbon dioxide adsorbing materials; wherein the carbon dioxide adsorbing materials are configured to adsorb carbon dioxide generated by heating the feed stream with the heat source and the outlet is configured to allow hydrogen gas to exit the chamber.

High surface area structures for generating hydrogen and separating carbon dioxide from a feed stream including hydrocarbons and water are disclosed. In some embodiments, the structures include the following: a monolithic structure having a washcoated high surface area stabilized carrier; carbon dioxide adsorbing materials deposited on surfaces on the high surface area stabilized carrier; and one or more washcoated layers of combined steam reforming and water gas shifting catalysts on the monolithic structure; wherein the washcoated layers of the stabilized carriers, the carbon dioxide adsorbing materials, and the one or more washcoated layers of combined steam reforming and water gas shifting catalysts are configured so as to resist the formation of coke between hydrocarbons in the feed stream and the surfaces of the monolithic structure when the temperature of the feed stream is less than about 500 degrees Celsius.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Generally, the disclosed subject matter relates to systems and methods for generating hydrogen and separating CO2 from a feed stream including hydrocarbons and water. Systems and methods according to the disclosed subject matter include the use of multi-layered well-dispersed CO2 adsorbents that are wash coated on a monolith substrate, e.g., a metal or ceramic structure, a heat exchanger, etc., to develop a CO2 sequestering process while steam reforming carbon-based gaseous feeds to generate hydrogen for power generation.

In some embodiments, the walls of process gas channels of a monolithic substrate, e.g., a heat exchanger, are wash coated with a first layer of high surface area carrier such as activated $A_2O_3$ containing metal oxides capable of adsorbing CO2 and a second layer of steam reforming (SR) and or WGS catalysts. By the proper choice of the SR and or WGS catalysts, the catalysts can also function as combustion catalysts with the introduction of small amounts of oxygen, e.g., air, and fuel to oxidize and generate an exotherm to desorb the CO2 during the regeneration cycle. The small amount of added O2, e.g., air, can also oxidize any coke that may have formed, thus generating more CO2 and preventing catalytic deactivation. Alternatively, the combustion catalyst can be present in a third layer of washcoat.

In some embodiments, the application in the field can be in the form of a swing reactor, which produces hydrogen in its sorption and reforming mode and produces CO2 in its desorption mode. Instead of handling solids within or between reactors to accomplish hydrogen production and sorbent regeneration, gases are handled by switching between banks of swing reactors. The hydrogen is typically, but not always, used in a solid oxide fuel cell to generate electricity. Portions of the hydrogen generated can also be used as fuel or feedstock for the systems themselves.

Referring now to FIGS. 1-4, some embodiments of the disclosed subject matter include a system 100 for generating hydrogen and separating CO2 from a feed stream 102 including hydrocarbons 104 and water 106.

Figure 1:
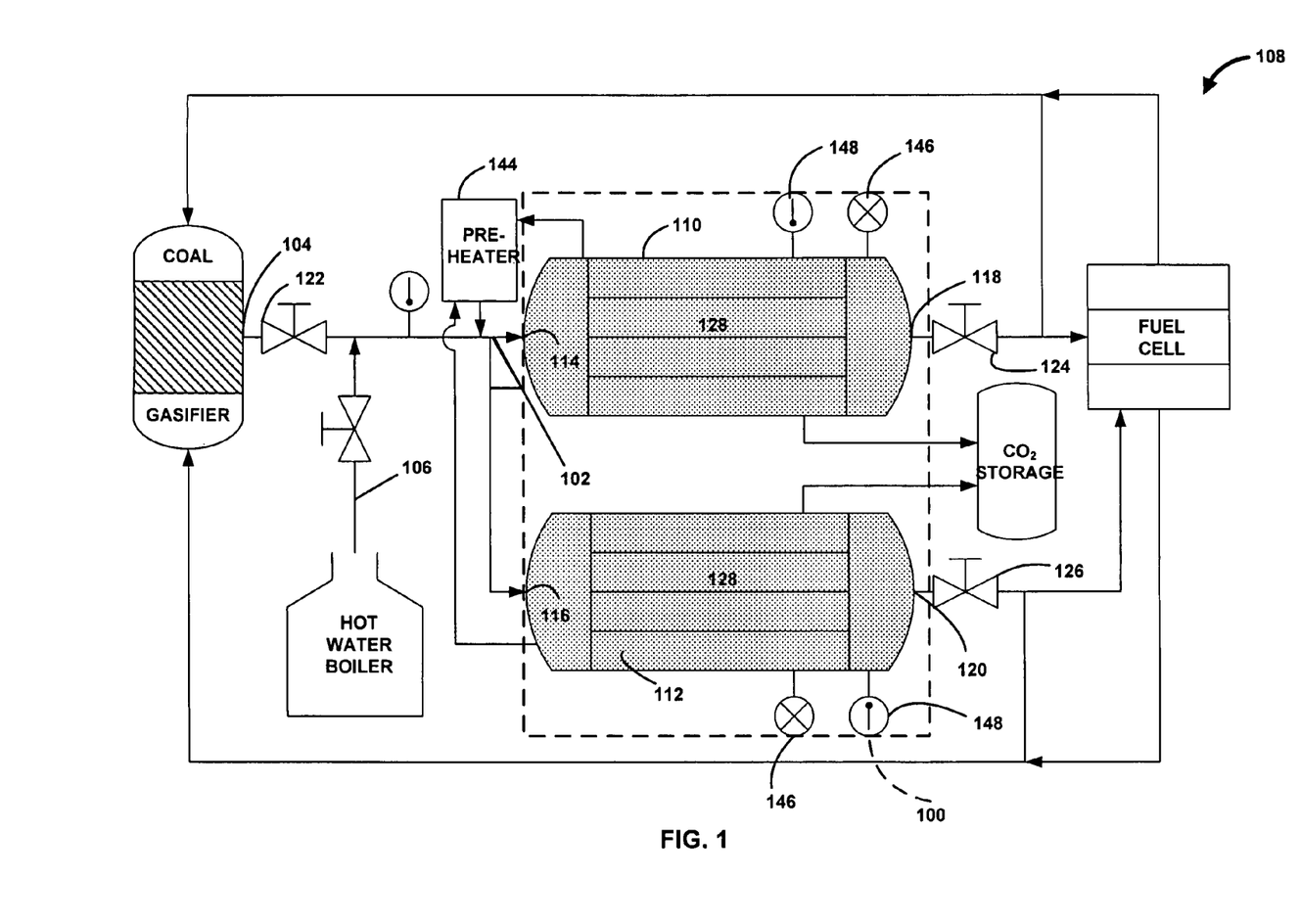
FIG. 1 is a diagram of a system according to some embodiments of the disclosed subject matter.

System 100 is typically included as one of a plurality of components that define a power plant 108. System 100 includes a pair of catalytic chambers 110, 112 that each has an inlet 114, 116 and an outlet 118, 120. System 100 also includes valves 122, 124, 126 for opening and closing inlets 114, 116 and outlets 118, 120. Outlet 118, 120 are configured to allow hydrogen gas to exit chambers 110, 112. Although system 100 could operate with only a single chamber, by including two chambers, one chamber can be used to generate hydrogen and sequester CO2 while the other is regenerating the adsorbent. This process can be reversed so that there is always one chamber generating hydrogen.

Figure 2:
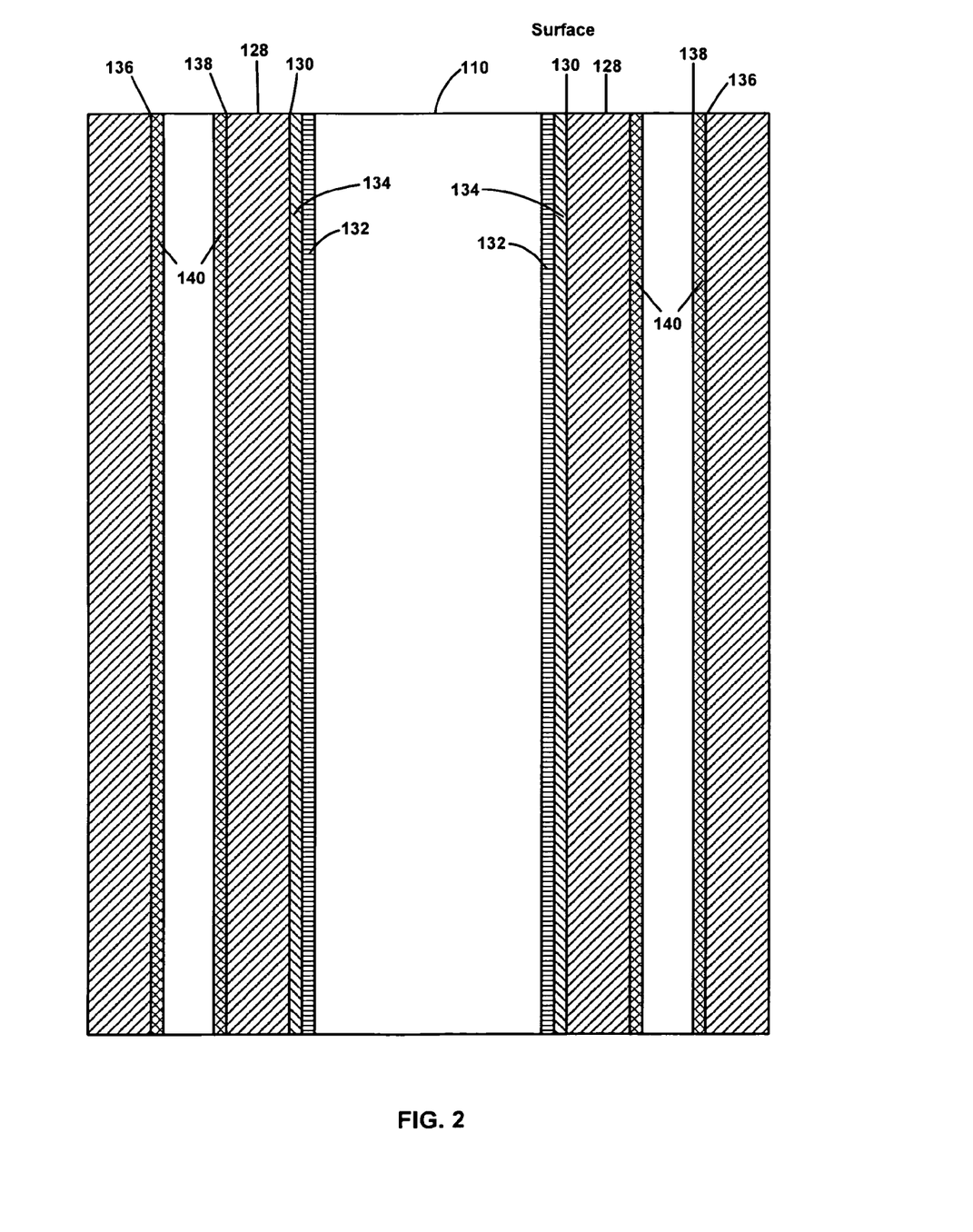
FIG. 2 is a cross-section of a chamber according to some embodiments of the disclosed subject matter.
Figure 3:
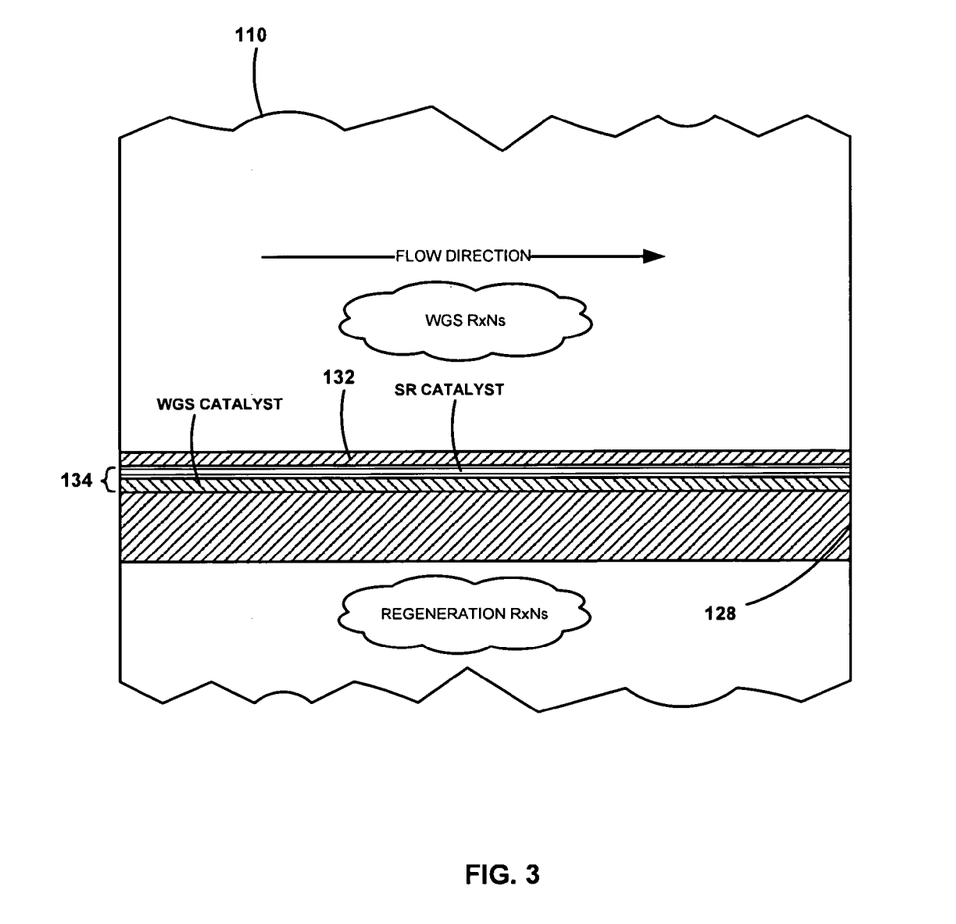
FIG. 3 is an enlarged portion of a cross-section of a chamber according to some embodiments of the disclosed subject matter

One or more monolithic structures 128 are positioned within each of chamber 110, 112. Monolithic structures 128 usually have low surface areas and thus a high surface area carrier is deposited via a washcoat on its walls containing the CO2 sequestering material along with an active steam reforming and/or water gas shift catalysts. The stabilized carriers are typically, but not always, Al2O3, CeO2, CeO2-ZrO2, Al stabilized CeO2, SiO2, TiO2, zeolites, or combination thereof. As shown in FIGS. 2 and 3, monolithic structures 128 include surfaces 130 coated with washcoated layers containing CO2 adsorbing materials 132 and steam reforming and water gas shift catalysts 134 as a single layer, as shown in FIG. 2, or separate layers, as shown in FIG. 3. CO2 adsorbing materials 132 are configured to adsorb CO2 generated by steam reforming and water gas shifting a heated feed stream 102 in the presence of steam reforming and water gas shift catalysts 134. Although not shown, in some embodiments, e.g., where steam reforming and water gas shift catalysts 134 do not also act as combustion catalysts, a third washcoated layer including additional combustion catalysts can be included.

Monolithic structures 128 are fabricated as described in U.S. Pat. No. 6,849,572, which is incorporated by referenced as if fully disclosed herein. Incipient wetness techniques are used to highly disperse CO2 adsorbing materials 132 in the form of particles, or other carbon retaining sorbent particles, uniformly within an alumina or similar washcoat. At least one of CO2 adsorbing materials 132 is an alkaline metal oxide including at least one of CaO, BaO, MgO, SrO, etc., or combination thereof. Other materials can be utilized for CO2 adsorbing materials 132 providing they are alkaline materials capable of adsorbing CO2. Similar technology has been utilized to fabricate modern automobile catalytic converters. Combined steam reforming, water gas shift, and combustion catalysts 134 include one or more platinum group metal components. In some embodiments, surfaces 136 of chambers 110, 112 and surfaces 138 of heat exchanger monolithic structures 128 are coated with combustion catalysts 140 formed from one or more platinum group metal components.

Figure 4:
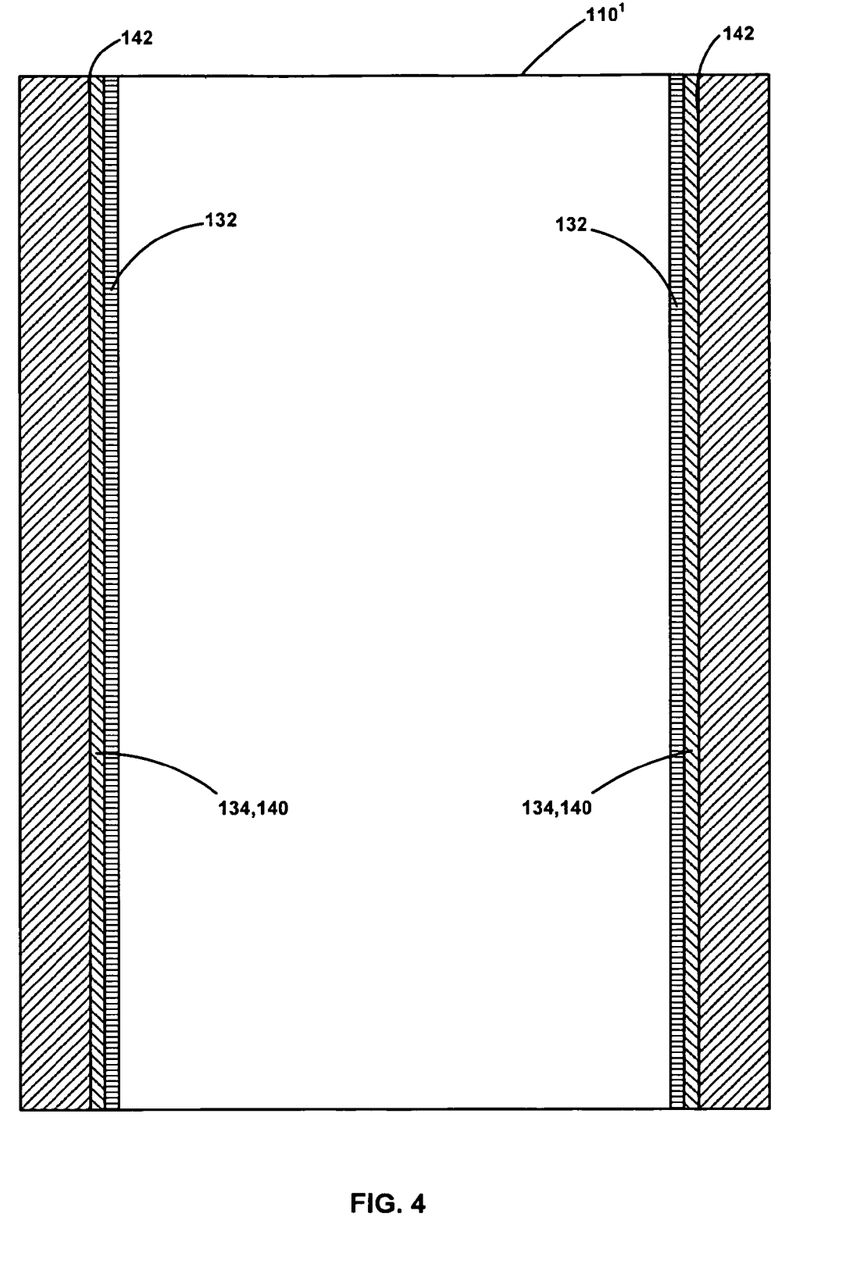
FIG. 4 is a cross-section of a chamber according to some embodiments of the disclosed subject matter.

As best shown in FIG. 4, in some embodiments, system 100 includes one or more catalytic chambers 110', each having interior surfaces 142 that are coated with any combination of CO2 adsorbing materials 132, steam reforming and WGS catalysts 134, and optionally combustion catalysts 140.

Referring again to FIG. 1, system 100 includes a heat source 144, e.g., a pre-heater, for heating feed stream 102 to a temperature range that allows the reactive generation of CO2 and hydrogen gas but does not cause substantial development of coke, via carbonizing reactions between hydrocarbons 104 in the feed stream and CO2 adsorbing materials 132. Substantial development of coke is defined herein as an amount of coke that impacts the efficiency of the system and or an amount of coke that continues to increase over operation time of the system. Typically, the upper end of the temperature range is less than about 500 degrees Celsius to prevent substantial coke formation. In some embodiments, this temperature can fluctuate depending on other operating parameters providing substantial coking does not occur. Each of chambers 110, 112 typically include pressure gauges 146 and temperature gauges 148 to monitor the conditions within the chambers and control the temperature to prevent the development of coke from occurring. In some embodiments, the temperature of feed stream 102 will either not require pre-heating or will require cooling to allow steam reforming reactions to occur.

CO2 adsorbing materials 132 are regenerated by desorbing the CO2 adsorbed by the CO2 adsorbing materials. Desorption is achieved by at least one of reducing the pressure in chambers 110, 112 and heating CO2 adsorbing materials 132. System 100 is configured to allow reduction of the pressure in chambers 110, 112, by preventing feed stream 102 from flowing into chamber 110, 112.

Feed stream 102 is typically, but not always, free of sulfur compounds. The presence of sulfur compounds in feed stream 102 can adversely affect the performance of system 100. In such cases, a desulfurization process can be added to system 100.

Figure 5:
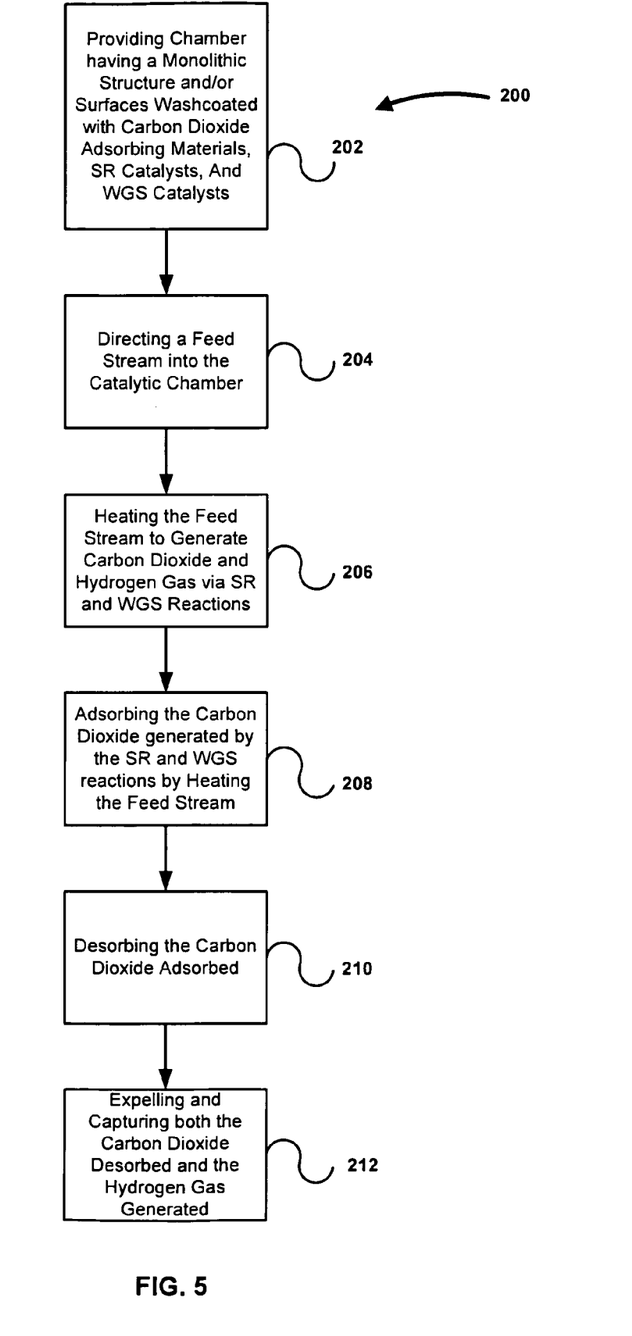
FIG. 5 is a diagram of a method according to some embodiments of the disclosed subject matter.

Referring now to FIG. 5, some embodiments of the disclosed subject matter include a method 200 of generating hydrogen and separating CO2 from a feed stream including hydrocarbons and water. At 202, a catalytic chamber including a monolithic structure or other surfaces coated with CO2 adsorbing materials and washcoat layers of a combined SR and WGS catalyst and combustion catalyst is provided. At 206, the feed stream is heated to a temperature range that allows the reactive generation of CO2 and hydrogen gas but does not cause substantial development of coking in the feed stream and the CO2 adsorbing materials. Typically, but not always, an upper end of the temperature range is less than about 500 degrees Celsius in order to thermodynamically favor water gas shift while still providing adequate reaction kinetics. In some embodiments, the feed stream will not require heating and/or may require cooling to allow water gas shift reactions to occur. At 208, the CO2 generated by heating the feed stream is adsorbed onto the CO2 adsorbing materials on the surfaces of the monolithic structure. At 210, the CO2 adsorbed onto the CO2 adsorbing materials on the surfaces of the monolithic structure are desorbed by at least one of reducing the pressure in the catalytic chamber or heating the CO2 adsorbing materials. At 212, the CO2 is expelled from the chamber and captured in a holding tank and the hydrogen gas generated is also expelled from the chamber and stored in a holding tank.

In some embodiments, the methods and systems disclosed can be modified to includes the necessary catalysts and or structure to remove constituents other than CO2, e.g., CO, etc. As one skilled in the art will appreciate, the methods and systems disclosed can be modified by including additional catalysts and or adsorbent materials that are preferential to selected constituents other than CO2.

Systems and methods according to the disclosed subject matter provide advantages and benefits over known systems and methods. Small dispersed adsorbent crystallites provide greater capacities and kinetics than bulk metal oxides, e.g., CaO, MgO, SrO, or BaO. The kinetics of adsorption and decomposition of surface carbonate complexes are accelerated by elimination of diffusion into or through pure carbonate compounds. Nano-dispersed crystallites have unique surface properties that create chemisorbed CO2 species on their surface rather than bulk carbonate compounds, which was first discovered for nano-dispersed BaO and CeO2 used as adsorbents in NOx traps for lean burn engines. These chemisorbed species can be desorbed at lower temperatures than the bulk carbonate compounds and thus require much lower temperatures for regeneration.

Technology according to the disclosed subject matter uses a catalyst and sorbent formulation fixed onto a substrate and works with a very thin layer, i.e., a 50-100 micron wash coat, which is capable of handling changes in temperature with little or no physical deterioration. In addition, the diffusion barrier common to particles will not be present because the alkaline metal oxide will be inter-dispersed in a high surface area alumina carrier. This technique is universally applied to maintain high catalyst effectiveness factors for a given mass of catalyst. The high support surface area will ensure significant catalyst-gas interaction over the entire operating range.

Systems according to the disclosed subject matter are operated at lower temperatures, weak chemisorption may responsible for fixing CO2 on the alkaline metal oxide surfaces rather than chemical bond formation evident in carbonation. Consequently, the energy requirements for desorption are lower than for calcinations required to decompose the carbonate compound.

While an external energy supply will be needed to generate hydrogen from methane, operating the reactor at reduced temperatures will result in higher molar yield of hydrogen. The benefits of reduced temperatures are not limited to energy and yield efficiencies but are also important from volume loss and sintering perspective. Operating at low temperatures will help preserve the integrity of both adsorbent wash coat materials and support materials.

Systems and methods according to the disclosed subject matter eliminate the need for handling of catalyst and sorbent by mechanical means, e.g., fluidized of fixed bed reactor technology, thus reducing the associated internal energy consumption, and mechanical and chemical degradation of catalyst and sorbent.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of generating hydrogen and separating carbon dioxide from a feed stream including hydrocarbons and water, the method comprising:
   providing a first catalytic chamber including surfaces coated with carbon dioxide adsorbing materials and one or more washcoated layers of combined steam reforming and water gas shift catalysts;
   providing a second catalytic chamber including surfaces coated with carbon dioxide adsorbing materials and one or more washcoated layers of combined steam reforming and water gas shift catalysts;
   controlling the feed stream to be alternatingly fed to at least one of said first and second catalytic chamber so that it has a temperature range that allows the reactive generation of carbon dioxide and hydrogen gas but does not cause substantial development of coke between hydrocarbons in the feed stream and said surfaces of said catalytic chamber; and
   adsorbing and desorbing said carbon dioxide generated by heating the feed stream, wherein said carbon dioxide is alternatingly adsorbed onto and desorbed from said surfaces of said first and second catalytic chambers coated with carbon dioxide adsorbing materials.

2. The method according to claim 1, wherein said carbon dioxide adsorbing materials wherein at least one of said carbon dioxide adsorbing materials is an alkaline metal oxide including one of CaO, MgO, SrO, BaO, and a combination thereof.

3. The method according to claim 1, wherein an upper end of said temperature range is less than about 500 degrees Celsius.

4. The method according to claim 1, wherein at least one of said first and second catalytic chambers includes surfaces having steam reforming, water gas shift, and combustion catalysts.

5. The method according to claim 4, wherein said steam reforming, water gas shift, and combustion catalysts include one or more platinum group metal components.

6. The method according to claim 1, said method further comprising:
   desorbing said carbon dioxide adsorbed onto carbon dioxide adsorbing materials.

7. The method according to claim 6, wherein said carbon dioxide is desorbed by at least one of reducing the pressure in at least one of said first and second catalytic chambers and heating said carbon dioxide adsorbing materials.

8. A system for generating hydrogen and separating carbon dioxide from a feed stream including hydrocarbons and water, the system comprising:
   a first catalytic chamber having an inlet and an outlet and means for opening and closing said inlet and said outlet;
   a second catalytic chamber having an inlet and an outlet and means for opening and closing said inlet and said outlet;
   a first monolithic structure positioned within said first chamber, said monolithic structure having surfaces coated with carbon dioxide adsorbing materials and one or more washcoated layers of combined steam reforming and water gas shift catalysts;
   a second monolithic structure positioned within said second chamber, said monolithic structure having surfaces coated with carbon dioxide adsorbing materials and one or more washcoated layers of combined steam reforming and water gas shift catalysts;
   a heat source for heating the feed stream to a temperature range that allows the reactive generation of carbon dioxide and hydrogen gas but does not cause substantial development of coke between hydrocarbons in the feed stream and said surfaces of said monolithic structure; and
   means for heating said carbon dioxide adsorbing materials;
   wherein said carbon dioxide adsorbing materials are configured to adsorb carbon dioxide generated by heating the feed stream with said heat source and said outlet is configured to allow hydrogen gas to exit said chamber; wherein
   said feed stream is configured to be alternatingly delivered to said first chamber and said second chamber.

9. The system according to claim 8, wherein at least one of the surfaces of said first and second chambers and said surfaces of said first and second monolithic structures include steam reforming, water gas shift, and combustion catalysts positioned thereon.

10. The system according to claim 8, wherein at least one of said carbon dioxide adsorbing materials is an alkaline metal oxide including one of CaO, MgO, SrO, BaO, and a combination thereof 11. The system according to claim 8, wherein said system is configured for desorbing said carbon dioxide adsorbed by said carbon dioxide adsorbing materials by at least one of reducing the pressure in at least one of said first and second catalytic chambers and heating said carbon dioxide adsorbing materials.

12. The system according to claim 8, wherein at least one of said first and second monolithic structure is a heat exchanger.

13. A high surface area structure for generating hydrogen and separating carbon dioxide from a feed stream including hydrocarbons and water, the structure comprising:
   a first monolithic structure having a washcoated high surface area stabilized carrier;
   a second monolithic structure having a washcoated high surface area stabilized carrier;
   carbon dioxide adsorbing materials deposited on surfaces on said high surface area stabilized carrier; and
   one or more washcoated layers of combined steam reforming and water gas shifting catalysts on said monolithic structure;
   wherein said washcoated layers of said stabilized carriers, said carbon dioxide adsorbing materials, and said one or more washcoated layers of combined steam reforming and water gas shifting catalysts are configured so as to resist the formation of coke between hydrocarbons in the feed stream and said surfaces of said monolithic structure when said temperature of the feed stream is less than about 500 degrees Celsius; wherein
   the feed stream is configured to be alternatingly delivered to said first monolithic structure and said second monolithic structure.

14. The high surface are structure according to claim 13, wherein said high surface area stabilized carrier includes one or more washcoated layers of one of activated Al2O3, CeO2, CeO2-ZrO2, Al stabilized CeO2, SiO2, TiO2, zeolites, and a combination thereof.

15. The high surface are structure according to claim 13, wherein at least one of said carbon dioxide adsorbing materials is an alkaline metal oxide including one of CaO, MgO, SrO, BaO, and a combination thereof deposited on a high surface area carrier.

16. The high surface are structure according to claim 13, wherein at least one of said first and second monolithic structures includes surfaces having at least one or more washcoated layers of alkaline material and combined steam reforming, water gas shift, and combustion catalysts.

17. The high surface are structure according to claim 16, wherein said steam reforming, water gas shift, and combustion catalysts include one or more platinum group metal components.

* * * * *